(12) United States Patent
Pefkianakis et al.

(10) Patent No.: US 10,171,140 B2
(45) Date of Patent: Jan. 1, 2019

(54) MU-MIMO GROUP SELECTION

(71) Applicant: HEWLETT PACKARD ENTERPRISE DEVELOPMENT LP, Houston, TX (US)

(72) Inventors: Ioannis Pefkianakis, Palo Alto, CA (US); Sanjib Sur, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 109 days.

(21) Appl. No.: 15/275,723

(22) Filed: Sep. 26, 2016

(65) Prior Publication Data

US 2018/0092102 A1    Mar. 29, 2018

(51) Int. Cl.
*H04B 7/04* (2017.01)
*H04B 7/0452* (2017.01)
*H04W 72/08* (2009.01)

(52) U.S. Cl.
CPC .................................. *H04B 7/0452* (2013.01)

(58) Field of Classification Search
None
See application file for complete search history.

(56) References Cited

U.S. PATENT DOCUMENTS

| | | | |
|---|---|---|---|
| 2016/0127096 A1* | 5/2016 | Lee | H04W 72/0453 375/267 |
| 2016/0255610 A1* | 9/2016 | Li | H04B 7/0413 370/329 |
| 2016/0337879 A1* | 11/2016 | Hwang | H04B 17/336 |
| 2017/0070914 A1* | 3/2017 | Chun | H04L 1/0026 |
| 2017/0188204 A1* | 6/2017 | Kela | H04W 4/08 |
| 2018/0006699 A1* | 1/2018 | Enescu | H04B 7/0626 |
| 2018/0027437 A1* | 1/2018 | Vitthaladevuni | H04W 24/10 |

* cited by examiner

*Primary Examiner* — Eunsook Choi
(74) *Attorney, Agent, or Firm* — Hewlett Packard Enterprise Patent Department

(57) ABSTRACT

An example communications device includes communications circuitry and control circuitry. The communications circuitry may wirelessly communicate with client devices. The control circuitry may determine signal-to-interference-plus-noise ratios (SINRs) for the client devices based on compressed client-side channel state information received from the client devices. The control circuitry may select, based on the SINRs and in consideration of multiple possible bandwidth settings, a set of multi-user-multiple-input-multiple-output (MU-MIMO) groups each with an assigned bandwidth setting.

18 Claims, 7 Drawing Sheets

MU-MIMO GROUP SELECTION

BACKGROUND

Multi-User-Multiple-Input-Multiple-Output (MU-MIMO) is a wireless communication technique that allows a communications device (such as an access point) to transmit multiple distinct data streams over the same frequency channel concurrently to multiple client devices. The MU-MIMO capable communications device has multiple antennas and utilizes beamforming to transmit the multiple data streams via the multiple antennas (thus, the communications device is sometimes referred to as a beamformer). Beamforming involves varying parameters of the individual signals transmitted by the antennas (such as the phase or amplitude) so as to manipulate the combined radiation pattern that is emitted by the antennas in some desired way—for example, the radiation pattern may be spatially shaped in such a manner that the strength of the signal is increased at a client device's location. MU-MIMO utilizes a particular form of beamforming known as precoding, which is characterized by having multiple distinct data streams that are transmitted with independent weightings (as opposed to transmitting the same data stream from each antenna). By exploiting knowledge of channel states of the client devices, the MU-MIMO beamformer is able to use precoding to concurrently send multiple distinct data streams to multiple client devices, with each of the client devices being able to recover the stream that is intended for the client device from among all of the other transmitted streams and noise.

In particular, the communications device may form a number of MU-MIMO groups that each include one or more client devices. The MU-MIMO groups each constitute a grouping of client devices that are to have their data transmitted concurrently. For each transmission period, the communications device may select one of the MU-MIMO groups to be a target group that is to receive transmission during that period. During each transmission period, data may be transmitted concurrently to each of the client devices that are part of the target MU-MIMO group. Thus, if the number of MU-MIMO groups formed by the beamformer is M, then all of the client devices that are connected to the beamformer may receive a transmission in as few as M transmission periods using MU-MIMO techniques; in contrast, it may take N transmission periods to transmit to all of the client devices in single-user mode, where N is the number of client devices connected to the beamformer. M is generally less than N (M may be as low as $$\text{ROUND\_UP}\left[\frac{N}{A}\right].$$

where A is a maximum number of data streams that the communications device can concurrently transmit), and therefore the number of transmission periods that are used to transmit to all of the client devices using MU-MIMO techniques is generally less than the number of transmission periods used to transmit to all of the client devices using single-user transmission. Since the same amount of data may be transmitted using MU-MIMO techniques in fewer transmission periods than when using single-user transmission, the overall throughput of the network may be greatly increased.

DETAILED DESCRIPTION

Figure 1:
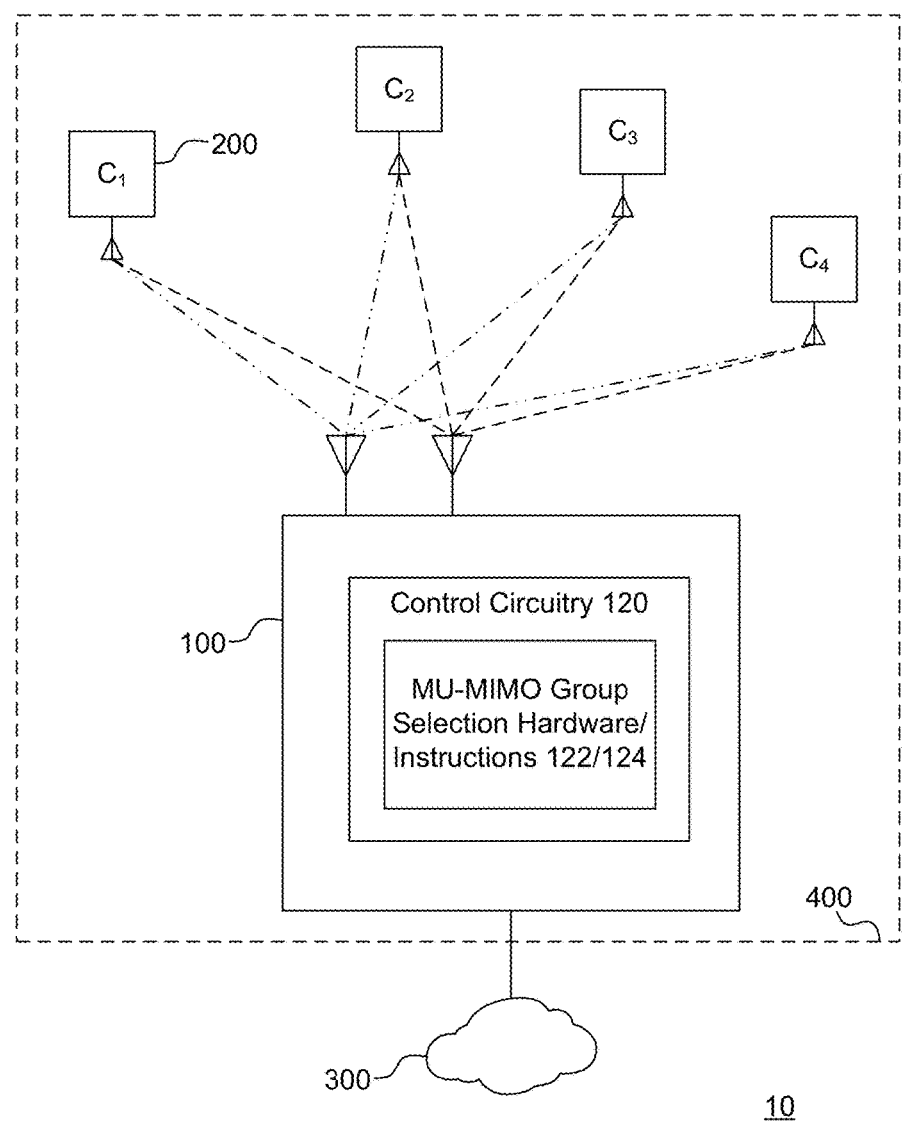
FIG. 1 is a conceptual diagram illustrating an example system comprising a communications device, client devices, and an external network.

As described above, MU-MIMO techniques have the potential to greatly increase the throughput of a network as compared to single-user transmission techniques. However, the actual throughput of a network that uses MU-MIMO techniques may vary widely depending on many factors, including how client devices are grouped for transmission. In particular, if the MU-MIMO groups are poorly selected, the potential throughput gains that could be provided by using MU-MIMO techniques may not be fully realized, or may not be realized at all.

Sub-optimal throughput when using MU-MIMO techniques may result, in part, from grouping together in the same MU-MIMO group two or more client devices whose channels interfere with one another. Conversely, throughput of the network when using MU-MIMO techniques may be optimized by intelligently forming the MU-MIMO groups so as to reduce such inter-user interference. In particular, high throughput gains may be achieved when, for each MU-MIMO group, all of the users that are included in the same MU-MIMO group have instantaneous wireless channels that are orthogonal, resulting in zero inter-user interference.

In order to optimally form the MU-MIMO groups, the communications device may estimate throughputs for potential MU-MIMO groups and select the best MU-MIMO groups based, in part, on these estimated throughputs. For example, if the communications device had full knowledge of the channels of each client device, the communications device may be able to determine certain parameters that may be used to estimate throughputs of potential MU-MIMO groups.

However, in certain contexts such full knowledge of the channels of each client device is not available or would be too costly to obtain (e.g., obtaining the full channel state information results in transmissions of large amounts of data from clients to the communications device, thus increasing signaling overhead). For example, the wireless LAN standard IEEE 802.11ac does not support client devices sending full channel state information to an access point, and thus techniques that estimate parameters based on such full channel state information would not be compatible with IEEE 802.11ac devices.

Thus, the present disclosure provides example devices and techniques for determining certain parameters that may be useful in estimating throughputs of potential MU-MIMO groups based on information that is less complete than full channel state information. For example, certain example communications devices disclosed herein may determine a signal-to-interference-plus-noise ratio (SINR) based on compressed channel state information received from the client devices, were the compressed channel state information is a representation of the channel state that is less complete than a full representation of the channel state. For example, the compressed channel state information may be a V matrix, which, in accordance with the wireless LAN standard IEEE 802.11ac, may be sent from client devices to an access point. Example techniques for estimating the SINR parameter based on the compressed channel state information are described in greater detail below with reference to FIG. 3.

Although the SINR parameter may be useful in estimating the throughputs of potential MU-MIMO groups, in certain contexts additional parameters may need to be considered along with the SINR to obtain optimal MU-MIMO groupings. For example, the bandwidth that client devices in a MU-MIMO group are set to use may affect the group's throughput (many wireless communication protocols provide for multiple possible bandwidths that can be used for a given communication channel—for example, IEEE 802.11ac allows for use of 20 MHz, 40 MHz, 80 MHz, and 160 MHz bandwidths). In particular, the throughput of a given MU-MIMO group may be different for each of the available bandwidth settings. Thus, in certain examples disclosed herein, the MU-MIMO group selection process takes into account how bandwidth may affect throughput (in addition to the SINR parameter). In particular, in certain examples disclosed herein, combinations of MU-MIMO group/bandwidth setting are jointly selected so as to optimize performance of the network.

In certain examples, combinations of MU-MIMO group/bandwidth may jointly selected by estimating a throughput $Th_{m,i}$ for each possible combination of MU-MIMO group $G_m$ and bandwidth setting $W_i$. Then those combinations of group/bandwidth that provide optimum performance may be selected based on the estimated throughputs $Th_{m,i}$. This approach may be referred to as the exhaustive approach, and is ensured to find the optimal combinations of group/bandwidth, since all possible combinations are considered.

In certain contexts, the exhaustive approach may entail a large amount of processing and/or communications overhead. Thus, in certain examples, the optimal combinations of group/bandwidth may be selected without necessarily having to calculate a throughput for each possible group/bandwidth combination. For example, knowledge about a relationship between bandwidth, SINR, and throughput may be exploited to allow estimation of throughputs for some combinations of group/bandwidth to be omitted while still taking into account multiple possible bandwidth settings and how these bandwidth settings affect throughput. This approach, which omits estimation of throughputs for some groups/bandwidths while still taking into account the effects of bandwidth on throughput, may be referred to as the efficient approach. The efficient approach may reduce the processing requirements and/or communications overhead relative to the exhaustive approach while still finding optimal combinations of group/bandwidth in most cases.

In particular, if it is known that a particular bandwidth produces the highest throughput for a given MU-MIMO group, then there is no need to estimate the throughput of the given group at any other bandwidths. While it is not always possible to know in advance that a given bandwidth will produce the highest throughput for a given group, there are circumstances in which this may be known. For example, generally speaking higher bandwidths produce higher throughputs, assuming certain conditions are satisfied. Specifically, if the SINR of each client device in a potential MU-MIMO group at a given bandwidth is above a certain threshold that is associated with the given bandwidth, then the throughput of the MU-MIMO group at the given bandwidth will be higher than the throughput of the same MU-MIMO group at any lower bandwidth. In other words, $(SINR_{k,m,i} > T_i)|_{\forall C_k \in G_m} \rightarrow (Th_{m,i} > Th_{m,j})|_{\forall W_j < W_i}$, where $SINR_{k,m,i}$ is the SINR of client $C_k$ in group $G_m$ at bandwidth $W_i$, $T_i$ is the threshold associated with bandwidth $W_i$, and $Th_{m,i}$ is the aggregate throughput of group $G_m$ at bandwidth $W_i$. The condition $(SINR_{k,m,i} > T_i)|_{\forall C_k \in G_m}$ may be referred to herein as "the SINR threshold condition" (i.e., each client device in a potential MU-MIMO group at a given bandwidth has an SINR that is above a threshold associated with the given bandwidth). For example, in an IEEE 802.11ac device that operates at $W_1 = 80$ MHz, $W_2 = 40$ MHz, $W_3 = 20$ MHz, the thresholds may be approximately $T_1 = 22$ dB and $T_2 = 19$ dB (note that in this example there is no threshold $T_3$ because $W_3$ is the lowest possible bandwidth).

Therefore, if the SINR threshold condition is satisfied for a given MU-MIMO group at the highest available bandwidth setting, then it can be known that the highest available bandwidth for the MU-MIMO group will provide the highest throughput for that group. Thus, in certain examples of the efficient approach, a group selection process may begin by considering potential MU-MIMO groups at the highest available bandwidth setting, and may proceed to consider lower bandwidth settings only for those MU-MIMO groups that do not satisfy certain selection criteria at the highest bandwidth setting. For example, groups that fail to satisfy the SINR threshold at the highest bandwidth may have their throughput estimated at a lower bandwidth Note that it is not always the case that the highest bandwidth setting produces the best throughput for a given MU-MIMO group. In certain cases in which the SINR threshold condition is not satisfied, the throughput of the group may actually be better at a lower bandwidth than it is at a higher bandwidth.

Figure 4:
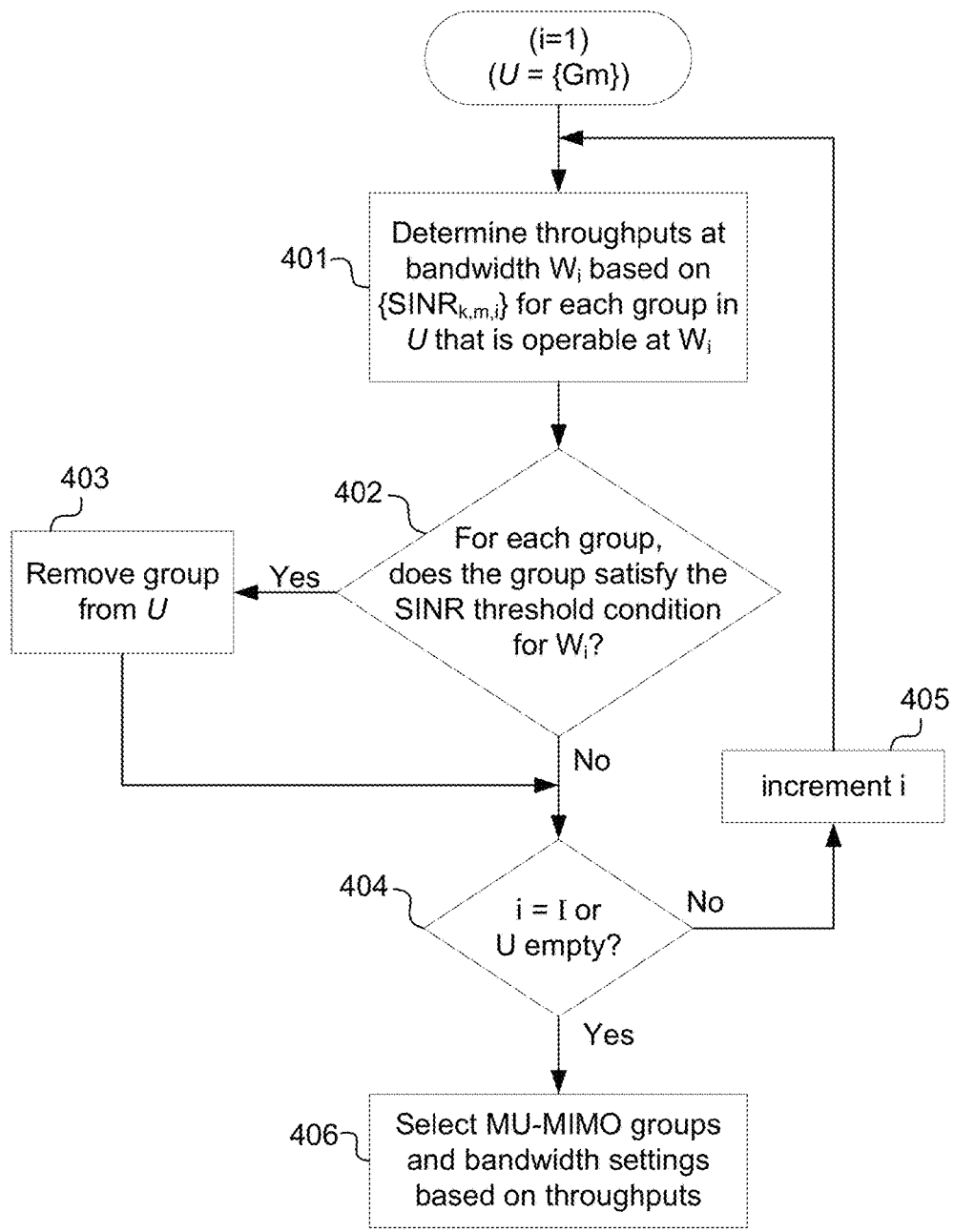
FIG. 4 is a process flow diagram illustrating an example pruned-exhaustive selection process for selecting MU-MIMO groups.

One example of how the efficient approach could be implemented would be to modify the exhaustive approach such that throughputs are estimated for each combination of MU-MIMO group and bandwidth except that, for any potential MU-MIMO group that satisfies the SINR threshold condition at a particular bandwidth, estimation of throughputs for that MU-MIMO group may be omitted at any bandwidths lower than that bandwidth. Then, the best potential MU-MIMO groups could be selected based on the estimated throughputs. For example, a process may estimate throughputs for each of the MU-MIMO groups starting at the highest bandwidth it can support, and may then proceed to estimate throughputs at a next lower bandwidth only for those groups that fail the SINR threshold condition at the highest bandwidth, and then the next lowest bandwidth may be considered and so on until the lowest bandwidth is reached (or until the SINR threshold condition has been satisfied by all groups). Such an example implementation of the efficient approach may be referred to as a pruned-exhaustive search. FIG. 4 illustrates an example pruned-exhaustive search process.

To compare a search according to the exhaustive approach with a pruned-exhaustive search according to the efficient approach, consider an example in which client devices A, B, and C are connected to an access point and available bandwidths include W1, W2, and W3; in such an example, there are seven possible MU-MIMO groups $G_i$ (A, B, C, AB, AC, ABC, BC) and twenty-one possible combinations of MU-MIMO group/bandwidth (A:W1, A:W2, A:W3, B:W1, B:W2, B:W3, C:W1, C:W2, C:W3, AB:W1, AB:W2, AB:W3, AC:W1, AC:W2, AC:W3, ABC: W1, ABC:W2, ABC:W3, BC:W1, BC:W2, and BC:W3). Further suppose that in each of the MU-MIMO groups except for the group ABC the SINR of each client device is greater than the threshold, and that W1>W2>W3. In this example, the search according to the exhaustive approach would include estimating a throughput for each of the twenty-one combinations of group/bandwidth, and selecting the combinations of group/bandwidth that optimize performance of the network based on the twenty-one estimated throughputs. On the other hand, in the pruned-exhaustive search a throughput would be estimated for only nine combinations of group/bandwidth—namely the combinations A:W1, B:W1, C:W1, AB:W1, AC:W1, ABC:W1, ABC:W2, ABC:W3, and BC:W1—and the combinations that optimize performance of the network may be selected from among these nine combinations of group/bandwidth based on the estimated throughputs. In this example, the efficient approach is able to omit estimating the throughput for the combinations A:W2, A:W3, B:W2, B:W3, C:W2, C:W3, AB:W2, AB:W3, AC:W2, AC:W3, BC:W2, and BC:W3 based on the fact that the SINR of each client device in these groupings is greater than the threshold and therefore the throughput of each of these groups at the highest bandwidth W1 is going to be the highest throughput for each of these groups. In this example, the efficient approach does not omit estimating the throughput for the combinations ABC:W2 and ABC:W3, since the SINR of at least one client device in the group ABC is less than the threshold and therefore it is not necessarily true that the throughput of this group at W1 is greater than its throughput at W2 or W3.

Another example of how the efficient approach could be implemented would be to perform an informed greedy selection process. In certain contexts, the informed greedy selection process may further reduce the amount of processing that is used compared to the pruned-exhaustive search. In particular, the informed greedy selection process may iteratively group client devices together according to certain selection criteria to form potential MU-MIMO groups. This may allow many SINR determinations and/or throughput estimations to be omitted, since a full set of MU-MIMO groups may be formed by the process before all possible combinations are considered. The informed greedy selection process does not necessarily obtain the highest collective throughput for the selected MU-MIMO groups in each case, since greedy selection by its nature tends to make locally optimal decisions each iteration rather than attempting to seek out the globally optimum decision. However, in certain circumstances the savings in processing requirements and/or communications overhead my offset any losses in overall throughput.

The informed greedy selection process considers multiple possible bandwidths in selecting the MU-MIMO groups. In particular, for each round of the informed greedy selection process, a bandwidth may be selected and only client devices that can support that current bandwidth are considered during that round. The highest bandwidth may be selected for the first round of the greedy selection process, and each subsequent round the selected bandwidth may be either the same as the previous round or the next lowest bandwidth.

Each round of the informed greedy selection process, a potential MU-MIMO group may be constructed by iteratively adding client devices the group, with each client devices being added only if they satisfy certain inclusion criteria. In particular, the inclusion criteria may include (1) that the client device satisfies the SINR threshold condition, and (2) a throughput criterion (individual and/or group throughput). The throughput condition may be, for example, that adding the client device to the group results in an aggregate throughput for the group that is better than the combined throughput of the client device operating in single user mode and the group without the client device. As another example, the throughput condition may be that adding the client device to the group produces an aggregate throughput for the group that is higher than the throughput that would be produced by adding any other client device to the group. In certain examples, the client devices may be considered in descending order of throughput, and each iteration the client device currently being considered may be added to the group if it satisfies the selection criteria.

The round terminates when a complete group is formed, or when no more client devices that satisfy the selection criteria can be added to the group. If the round terminates due to the potential group being complete, the potential group becomes one of the selected MU-MIMO groups with the currently selected bandwidth as its assigned bandwidth setting, and then another round of the greedy search may be executed again at the same bandwidth to find another MU-MIMO group (assuming there are any client devices that are not assigned to a group). If the round terminates with an incomplete group, then another round of the search may be executed again at the next bandwidth lower than the current bandwidth, and the incomplete group from the previous round may be considered again at the lower bandwidth to allow for more grouping opportunities. The rounds may proceed until a full set of MU-MIMO groups has been selected, meaning that all client devices have been assigned to a MU-MIMO group (even if that group happens to include only that client device).

Figure 5:
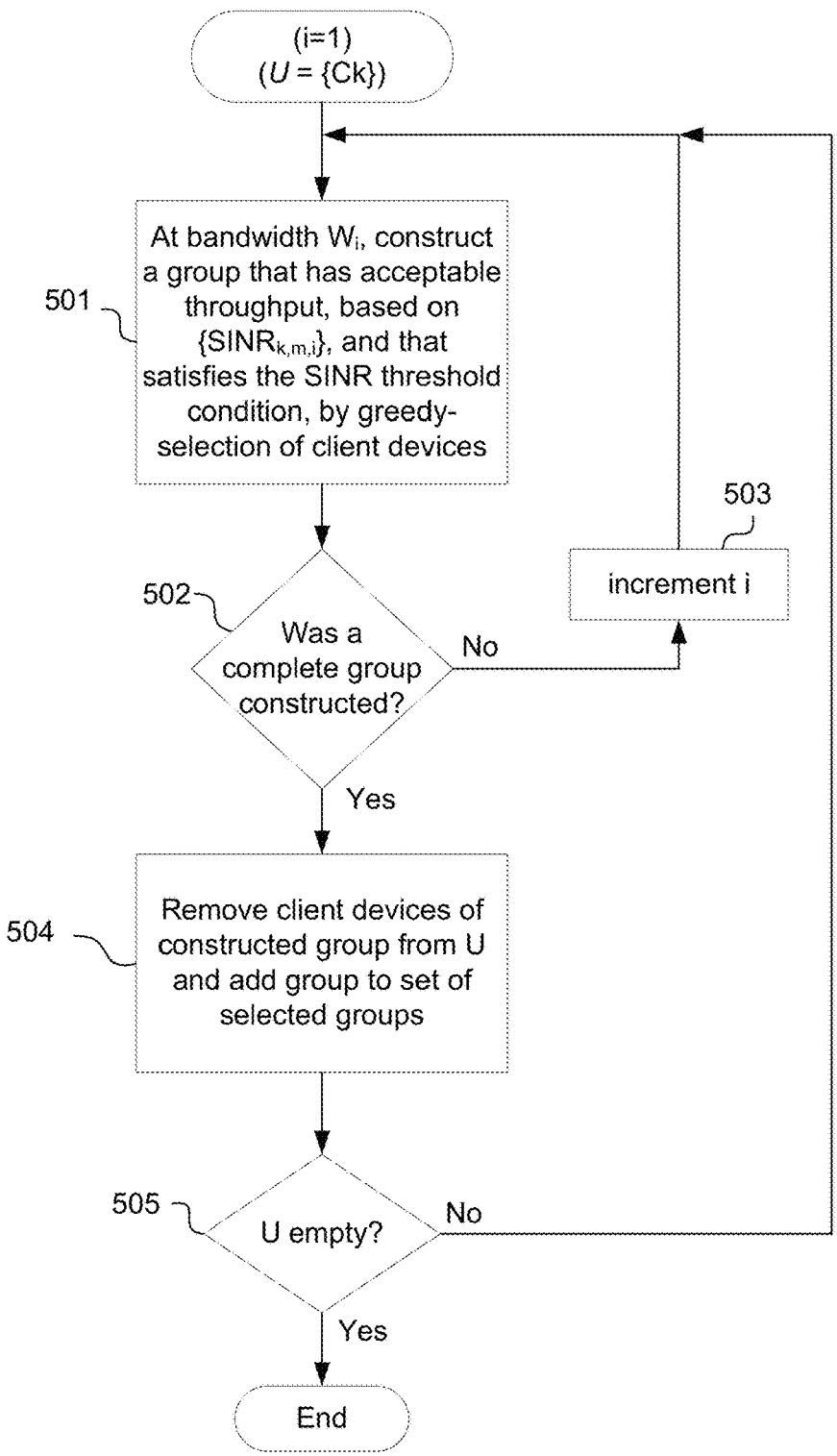
FIG. 5 is a process flow diagram illustrating an example informed greedy selection process for selecting MU-MIMO groups.

Such an informed greedy selection process is less computationally expensive than the exhaustive approach, with the informed greedy selection process having linear complexity to the number of client devices in the best and average case while in the exhaustive approach for C client device-bandwidth pairs the search space is O(C!). In particular, the informed greedy selection process can reduce computational time up to 67% (given three bandwidth options) compared to a simple greedy search. Algorithm 1 includes pseudocode for a particular example of the informed greedy selection process. FIG. 5 illustrates another example implementation of the informed greedy selection process.

---

Algorithm 1 Informed Greedy User Selection

1: Initialize & sort user set: $U = \{u_1, u_2, \ldots, u_N\}$. Define $T_{80}$, $T_{40}$, $T_{20}$
2: Final group set: $\varphi = \{\ \}$. Incomplete group set $\psi = \{\ \}$
3: for bw $\in \{80, 40, 20\}$
4:     greedy_user_selection(U, bw, $\varphi$, $\psi$)
5:     Remove the users included in set $\varphi$ from U. Go to step 3.
6: end for -continued Algorithm 1 Informed Greedy User Selection

```
 7:    return φ∪ψ
 8:    function greedy_user_selection(U, bw, φ, ψ)
 9:        Find the best-throughput group/user g ∈ ψ∪{u_i} for u_i ∈ U
10:        Set bandwidth for g to bw (if possible) and name it as g'
11:        foreach u_i ∈ U
12:            If (Th(g'∪{u_i}) > (Th(g') + Th(u_i))/2 & SINR_ui∈g' >
T_bw & bw_ui == bw & g' incomplete)
13:                g0 = g0 [ fuig
14:        If (g' is complete)
15:            If (Th(g') > Th(g)) φ = φ∪{g'} else φ = φ∪{g}
16:        elseif (Th(g') > Th(g)) ψ = ψ∪{g'} else ψ = ψ∪{g}
17:    end function
```

The examples described above, of both the exhaustive and efficient approaches, differ from processes in which MU-MIMO groups and bandwidths are selected independently. An example of such a process in which MU-MIMO groups and bandwidths are selected independently includes a process in which bandwidths are selected for client devices prior to group selection (for example, all of the client devices are set to operate at the same bandwidth setting) and then, in view of the already-assigned bandwidths, throughputs are determined for potential MU-MIMO groupings. In such a case, because the initial bandwidth assignments do not take into account how the bandwidth may affect the throughput of potential MU-MIMO groupings, the selected bandwidths may be sub-optimal for one or more of the groups. Another example of such a process in which MU-MIMO groups and bandwidths are selected independently includes a process in which MU-MIMO groups are first selected and then, in view of the already-selected groups, a bandwidth is selected for each of the groups. In such a case, because the initial group selections do not take into account how the bandwidth may affect the throughput of potential MU-MIMO groupings, the selected groups may be sub-optimal.

[Example System]

FIG. 1 illustrates an example system 10. The example system 10 includes a communications device 100, client devices 200 ($C_1$-$C_4$), and an external network 300. The communications device 100 utilizes MU-MIMO techniques to wirelessly communicate with the client devices 200, and may act as an access point to the network 300. In particular, the communications device 100 includes control circuitry 120 that may cause the communications device 100 to perform certain operations described herein. Specifically, the control circuitry 120 may include MU-MIMO group selection hardware 122 and/or instructions 124, which control MU-MIMO group selection operations. The communications device 100 may be, for example, a Wi-Fi access point (such as an IEEE 802.11ac access point), a cellular communications base station (such as an eNodeB in a Long Term Evolution (LTE) network), a WiMAX base station (such as an IEEE 802.16e base station), and the like. The network 300 may be any wired or wireless network, such as, for example, a local area network (LAN), a wide area network (WAN), the internet, a telecommunications backhaul network (such as an Evolved Universal Mobile Telecommunications System Terrestrial Radio Access Network (E-UTRAN) in an LTE network), a telecommunications core network (such as an Evolved Packet Core in an LTE network), and so on. The communications device 100 and client devices 200 that are connected thereto may be referred to herein as a wireless network 400.

[Example Communications Device]

Figure 2:
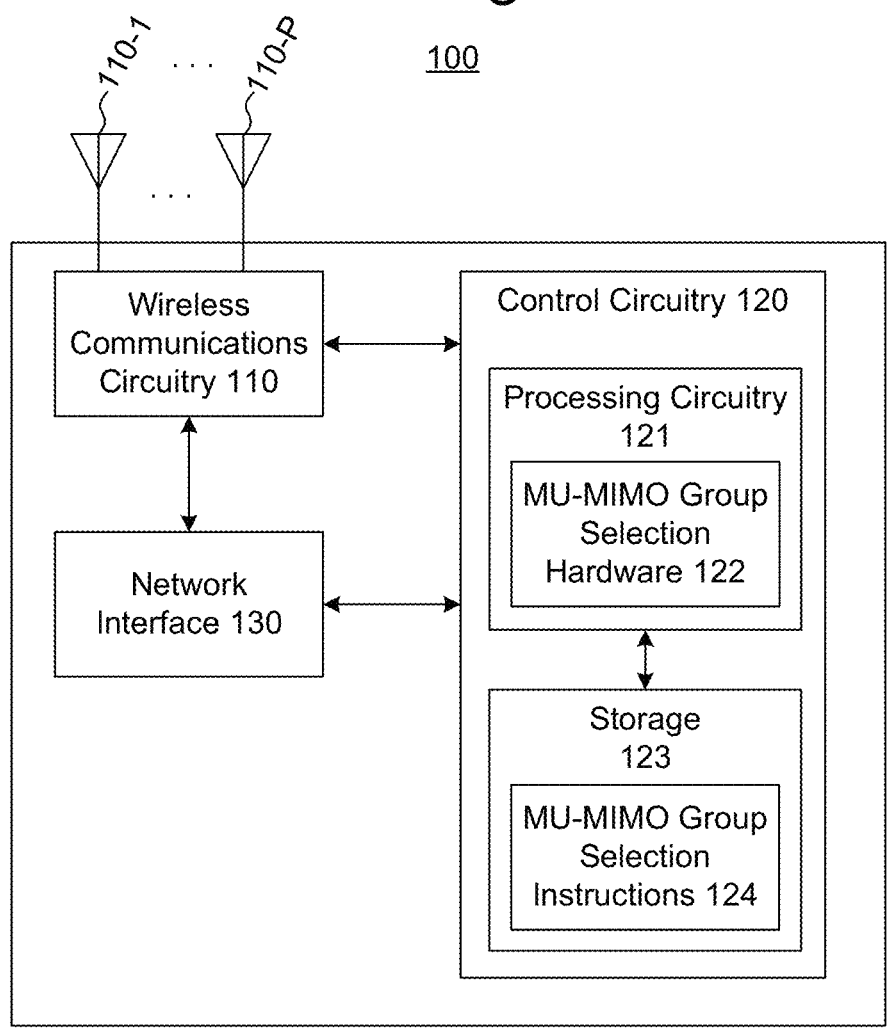
FIG. 2 is a conceptual diagram illustrating an example communications device.

FIG. 2 illustrates an example communications device 100. The communications device 100 includes wireless communications circuitry 110, control circuitry 120, and a network interface 130. The wireless communications circuitry 110 may use MU-MIMO techniques to wirelessly transmit messages to the client devices 200. The wireless communications circuitry 110 may also receive messages wirelessly transmitted from the client devices 200. The network interface 130 may connect the communications device 100 to a network, such as the network 300. The control circuitry 120 may control the wireless communications circuitry 110. The control circuitry 120 may also control the network interface 130.

The wireless communications circuitry 110 includes antennas 110-1 through 110-P, where P is an integer equal to or greater than two. The antennas 110-1 through 110-P may transmit and/or receive signals in the form of electromagnetic radiation. Any portion of the electromagnetic spectrum may be used to transmit/receive messages. A transport protocol adopted by the communications device 100 may specify a particular portion of the electromagnetic spectrum for transmission/reception (for example, IEEE 802.11ac specifies a 5 Ghz band). The wireless communications circuitry 110 may transmit up to P distinct transmission streams concurrently via the antennas 110-1 through 110-P, using MU-MIMO techniques. The wireless communications circuitry 110 may generate the transmission streams by packaging messages that are to be transmitted into transmission frames (e.g., MAC and PHY framing) according to the wireless transmission protocol adopted by the communications device 100, mapping the transmission frames to transmission symbols according to a modulation scheme and modulating a carrier signal based on the transmission symbols, and wirelessly transmitting the modulated signals via amplifiers and the antennas 110-1 through 110-P. Examples of wireless transmission protocols include IEEE 802.11, IEEE 802.16, 3GPP E-UTRA, and the like. Examples of modulation schemes include quadrature amplitude modulation (QAM), phase-shift keying (PSK), frequency-shift keying (FSK), amplitude-shift keying (ASK), frequency-division multiplexing (FDM), orthogonal frequency-division multiplexing (OFDM), continuous phase modulation (CPM), and the like. Some wireless transmission protocols specify use of a particular modulation schemes; for example, IEEE 802.11ac specifies use of QAM modulation. The wireless communications circuitry 110 may include circuitry for generating the carrier signal such as an oscillator, a modulator for modulating the carrier signal, filters, amplifiers, and the like. The wireless communications circuitry 110 may also include precoding circuitry that applies weights to the P signals using MU-MIMO techniques. The precoding weights may be determined by the control circuitry 120 (described in greater detail below). The wireless communications circuitry 110 may also receive wireless transmissions from client devices via the antennas 110-1 through 110-P, and may demodulate the received signals via demodulation circuitry to obtain reception frames. Reception frames whose payload is intended to go to the network 300 (e.g., data plane messages) may be sent to the network 300 via the network interface 130, while reception frames that include control plane messages may be sent to the control circuitry 120 for processing.

The control circuitry 120 may include any combination of hardware and stored machine-readable instructions. In particular, the control circuitry 120 may include MU-MIMO group selection hardware 122 and/or instructions 124 that are configured to cause the communications device 100 to perform one or more of the operations described herein. For example, the control circuitry may include processing circuitry 121, which forms the MU-MIMO group selection hardware 122, and storage 123, which may store the MU-MIMO group selection instructions 124.

The processing circuitry 121 may be any combination of circuitry configured to perform the operations described herein. In particular, the processing circuitry 121 may include one or more processors that are capable of executing machine-readable instructions, such as central processing units (CPUs), microprocessors, microcontrollers, digital signal processors (DSPs), field-programmable gate arrays (FPGAs), application-specific instruction set processors (ASIPs), etc. In examples in which the processing circuitry 121 includes such a processor, the MU-MIMO group selection hardware 122 may be constituted, in part, by the processor executing the MU-MIMO group selection instructions 124 stored in the storage 123. The processing circuitry 121 may also include dedicated circuitry to perform one, some, or all of the operations described herein, such as one or more application-specific integrated circuits (ASICs). In examples in which the processing circuitry 121 includes such dedicated circuitry to perform operations described herein, the MU-MIMO group selection hardware 122 may be constituted, in part, by the dedicated circuitry.

The storage 123 may be any non-transitory machine readable medium, which may include volatile storage media (e.g., DRAM, SRAM, etc.) and/or non-volatile storage media (e.g., PROM, EPROM, EEPROM, NVRAM, hard drives, optical disks, etc.). The storage 123 may store machine-readable instructions, which may include MU-MIMO group selection instructions 124. The MU-MIMO group selection instructions 124 may be such that they, when executed by the processing circuitry 121, cause the control circuitry 120 to perform the operations described herein, such as the operations described in FIGS. 3-6. In examples in which the MU-MIMO group selection hardware 122 is constituted entirely by dedicated hardware, the storage 123 and the MU-MIMO group selection hardware 122 may be omitted.

The control circuitry 120 may control the operations of the wireless communications circuitry 110 and/or the network interface 130. The control circuitry 120 may also determine precoding weights to be applied to the transmission streams based on MU-MIMO techniques. For example, each client device 200 may send to the communications device 100 beamforming feedback that includes at least some information describing the state of the client device 200's channel (such as the matrix $V_k$, discussed in greater detail below), and the control circuitry 120 may use the beamforming feedback to generate a steering matrix (which is an example of the precoding weights). The steering matrix may then be applied to the transmission streams. The control circuitry 120 may also generate control plane messages to be sent to client devices 200 via the wireless communications circuitry 110, and may process control plane messages received from client devices 200.

In particular, the control circuitry 120 may assign the client devices 200 to MU-MIMO groups. The MU-MIMO group assignments are used to determine which ones of the client devices 200 should be transmitted to concurrently during a given data-plane transmission interval. In particular, one MU-MIMO group is transmitted to at a time during separate data-plane transmission intervals. When a MU-MIMO group is the transmission target, all of the client devices 200 in the target MU-MIMO group may have their distinct data streams transmitted concurrently during the transmission interval using MU-MIMO techniques. The client devices 200 of any other MU-MIMO groups that are not the current transmission target are not transmitted to during the transmission interval. In general, the maximum number of client devices 200 to which distinct data streams may be concurrently transmitted (and hence the maximum number of client device 200 per MU-MIMO group) is related to the number of antennas that the communications device 100 has.

As described above, the choice of which client devices 200 to include in which MU-MIMO groups can affect performance of the wireless network 400. Thus, in assigning the client devices 200 to MU-MIMO groups, the control circuitry 120 may take into account the impact of the groupings on network performance. For example, the control circuitry 120 may assign client devices to MU-MIMO groups by performing any of the example processes illustrated in FIGS. 3-6.

The network interface 130 connects the communications device 100 to a network, such as the network 300. The network interface 130 includes at least one communications port that is connectable to the network, and may pass data between the wireless communications circuitry 110 and the network via the communications port. The network interface 130 may act as a hub, a bridge, a switch, a router, etc.

While the wireless communications circuitry 110, the control circuitry 120, and the network interface 130 are illustrated/described separately, this is merely for ease of explanation and does not imply that these components are necessarily physically or logically separated. For example, the wireless communications circuitry 110 and the control circuitry 120 may share one or more of same ASICs, such as a wireless transceiver chipset, and they may overlap with one another physically and/or functionally. Moreover, a particular operation may appropriately be described as being performed simultaneously by both the wireless communications circuitry 110 and the control circuitry 120, since the control circuitry 120 may control the wireless communications circuitry 110. For example, the wireless communications circuitry 110 may be said to modulate a carrier signal because it physically alters a parameter of the carrier signal, but the control circuitry 120 may also be said to modulate the carrier signal because it controls the wireless communications circuitry 110 in the modulation.

[Example Joint Group/Bandwidth Selection Processes]

Figure 3:
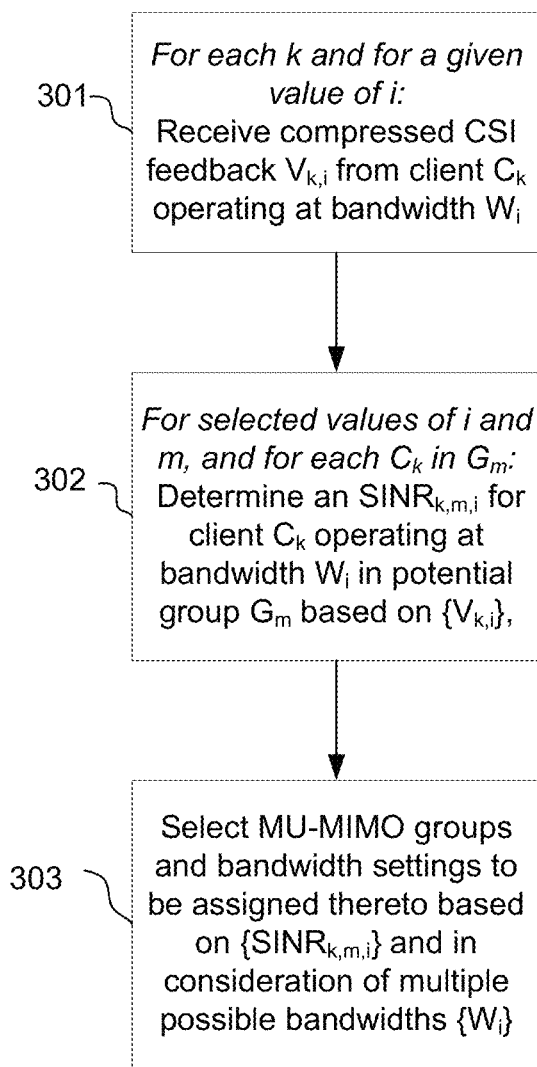
FIG. 3 is a process flow diagram illustrating an example process for selecting MU-MIMO groups.

FIG. 3 illustrates an example process for selecting MU-MIMO groups each with an assigned bandwidth, based on the SINR values. This process may be performed, for example, by a beamformer (such as the communications device 100).

In block 301, compressed client-side channel state information (CSI) feedback is received from a given client $C_k$ (such as one of the client devices 200) operating at a given bandwidth $W_i$. As used herein and in the appended claims, "compressed client-side channel state information" for a given client means a representation of information that: (1) is based on a representation of channel side information as determined by the client, and (2) contains only part of the information contained in the full representation of the channel side information determined by the client. Note that the state of the channel may appear differently to the beamformer and the client $C_k$, and hence "client-side" and "beamformer-side" are used herein to specify which side is measuring the CSI.

For example, if the client-side CSI measured by the client $C_k$ operating at a given bandwidth $W_i$ is represented by a channel matrix $H_{k,i}$, then the compressed client-side CSI feedback may be the right-side component matrix of the singular value decomposition of $H_{k,i}$. Specifically, if the singular value decomposition of $H_{k,i}$ is represented by $U_{k,i} \cdot D_{k,i} \cdot V_{k,i}^H$, then the compressed client-side CSI may be the matrix $V_{k,i}$. In general, a singular value decomposition is a way of representing a matrix in terms of other matrices that are multiplied together, akin to the concept of "factoring" for integers. In particular, for any m×n matrix, there exists a factorization called a singular value decomposition of the general form $L \cdot \Sigma \cdot R^H$, where L is an m×m unitary matrix (referred to herein as the "left-side SVD matrix"), $\Sigma$ is an m×n rectangular diagonal matrix with non-negative real numbers on the diagonal (referred to herein as the "center SVD matrix"), and R is an n×n unitary matrix (referred to herein as the "right-side SVD matrix"). In the context of the channel matrix the left-side, center, and right-side SVD matrices of the singular value decomposition of $H_{k,i}$ are labeled herein as $U_{k,i}$ $D_{k,i}$ and $V_{k,i}$ For example, the IEEE 802.11ac standard specifics that the clients send the matrix $V_{k,i}$ as beamforming feedback as part of a sounding procedure. In particular, in the IEEE 802.11ac standard the clients measure $H_{k,i}$, but do not send back $H_{k,i}$ to the beamformer, since $H_{k,i}$ is too large; instead, the client devices derive $V_{k,i}$ from $H_{k,i}$ and send back $V_{k,i}$ to the beamformer. In certain examples, $V_{k,i}$ may be even further compressed by the client devices before being sent to the beamformer, in which case the beamformer may decompress the information received from the client devices to obtain $V_{k,i}$.

In block 302, a value $SINR_{k,m,i}$ is determined based on the set of compressed client-side CSI feedback values $\{V_{k,i}\}$, where the value $SINR_{k,m,i}$ represents an estimate of what the signal-to-interference-plus-noise ratio of the client $C_k$ operating at the bandwidth $W_i$ in a given MU-MIMO group $G_m$ would be. Note that each client $C_k$ could have a different SINR for each combination of potential MU-MIMO group $G_m$ and bandwidth $W_i$, and therefore multiple values $SINR_{k,m,i}$ may be determined. For example, if the exhaustive approach is used, then $SINR_{k,m,i}$ may be determined for each client device in each combination of group and bandwidth (i.e., for each value of k, m, and i). As another example, if the efficient approach is used, then $SINR_{k,m,i}$ may be determined for each client device $C_k$ in certain (but not necessarily all) combinations of groups $G_m$ and bandwidths $W_i$, (i.e., for selected combinations of m and i, and, given such a combination, for each value of k such that $C_k \in G_m$).

For example, a value $SINR_{k,m,i}$ may be determined using the following formula:

$$SINR_{k,m,i} = \left( \frac{k\eta}{\|D_{k,i}\|^2} + \sum_{\substack{j \neq k \\ C_j \in G_m}} \|V_{k,i}^H V_{j,i}\|^2 \right)^{-1} \quad \text{(eq. 1)}$$

where j is such that $C_j \in G_m$ and $j \neq k$, K is the total number of clients in the given MU-MIMO group $G_m$, $\eta$ is an estimate of the noise floor, and $D'_{k,i}$ is a matrix estimated by the communications device.

The parameters $D_{k,i}$ and $\eta$ in equation 1 may be estimated by various methods. For example, if a MU Exclusive Beamforming report from the client device $C_k$ is available, then then $D_{k,i}$ and $\eta$ may be estimated from values specified in this report, including average SNR ($\overline{SNR}_{k,i}$, averaged over all sub-carriers) and delta SNR ($\Delta SNR_{k,i}$) values. In particular, if the client device $C_k$ has already been in a MU-MIMO group for previous communications, then the client device may have sent such a MU Exclusive Beamforming report to the beamformer as part of the previous communications. When such values are available, the term $$\frac{\eta}{\|D_{k,i}\|^2}$$

from equation 1 may be estimated as:

$$\frac{\eta}{\|D_{k,i}\|^2} = \left( 10^{\frac{\overline{SNR}_{k,i} + \Delta SNR_{k,i}}{10}} \right)^{-1} \quad \text{(eq. 2)}$$

If a MU Exclusive Beamforming report is unavailable, such as when a client device has not previously been in a MU-MIMO group, then an error vector magnitude (EVM) may be used to estimate the noise floor $\eta$, and $D_{k,i}$ may be estimated from a beamformer-side channel matrix $H'_{k,i}$. The beamformer-side channel matrix $H'_{k,i}$ corresponds to full CSI, and is a matrix representation of the channel between the beamformer and the client device $C_k$ at bandwidth $W_i$, as measured at the beamformer. Note that $H'_{k,i}$ (measured at the beamformer) is not necessarily the same as $H_{k,i}$ (measured at the client device $C_k$). Once $H'_{k,i}$ is obtained, the communications device may determine the singular value decomposition of $H'_k$, and a scaled version of the center SVD matrix of the singular value decomposition may be treated as $D_{k,i}$. In particular, if the singular value decomposition of $H'_{k,i}$ is given by $H'_{k,i} = U'_{k,i} \cdot D'_{k,i} \cdot V'_{k,i}^H$, then $D_{k,i}$ may be estimated as:

$$\|D_{k,i}\|^2 = \|D'_{k,i}\|^2 10^{\frac{P_{AP,i} + P_{C_k,i}}{10}} \quad \text{(eq. 3)}$$

where $P_{AP,i}$ is the transmit power of the beamformer at wavelength $W_i$ and $P_{C_k,i}$ is the transmit power of the client device $C_k$ at wavelength $W_i$. The value $P_{C_k,i}$ may be send from client devices to the beamformer through event report frames during association. The beamformer-side channel matrix $H'_{k,i}$ may be measured from control packets received from the client device, such as an acknowledgement (ACK) packet or Request to Send/Clear to Send (RTS/CTS) packet.

In certain examples, the matrix $D_{k,i}$ may be determined at one bandwidth, and then, if the matrix is needed at other bandwidths, the matrix may be inferred from the already determined matrix. For example, if the matrix $D_{k,i}$ is determined at a particular bandwidth—let us say the bandwidth is $W_a$ (i.e., i=a) and thus the already determined matrix is $D_{k,a}$—then $D_{k,i}$ for any value of i other than a may be inferred from the already determined matrix $D_{k,a}$ as follows:

$$D_{k,i} = \frac{W_a}{W_i} D_{k,a} \quad \text{(eq. 4)}$$

In block 303, MU-MIMO groups are selected from among the potential groups $G_m$ based on the set of values $\{SINR_{k,m,i}\}$ that was determined in block 302 and in consideration of the multiple possible bandwidths $\{W_i\}$. For example, the exhaustive approach may be used in which a throughput is estimated for each combination of group and bandwidth based on the set of values $\{SINR_{k,m,i}\}$. As another example, the efficient approach may be used in which a throughput is estimated for some combinations of group and bandwidth based on the set of values $\{SINR_{k,m,i}\}$, but is omitted for certain bandwidths when the SINR threshold condition is satisfied.

Throughputs may be estimated based on the set of values $\{SINR_{k,m,i}\}$ by, for example, mapping $SINR_{k,m,i}$ values to PHY rates $R_{k,m,i}$, and then calculating individual or group-aggregate throughputs based on the PHY rates $R_{k,m,i}$, where $R_{k,m,i}$ is the PHY rate for client $C_k$ in group $G_m$ operating at bandwidth $W_i$. For example, IEEE 802.11ac includes table showing a relationship between signal-to-interference-plus-noise values and PHY rate values. As another example, a relationship between signal-to-interference-plus-noise values and PHY rate values may be determined experimentally or by modeling. Individual client device throughputs $Th_{k,m,i}$ may be determined, for example, based on the PHY rates $R_{k,m,i}$ as follows:

$$Th_{k,m,i} = \frac{DATA_k}{\frac{DATA_k}{R_{k,m,i}} + T_m} \quad (eq.\ 5)$$

where $DATA_k$ is the amount of data to be transmitted to client $C_k$ and $T_m$ is the network overhead time associated with group $G_m$. Aggregate throughput $\Sigma Th_{m,i}$ for a group $G_m$ may be determined, for example, as follows:

$$\sum Th_{m,i} = \frac{\sum_{k \in G_m} DATA_k}{MAX\left[\frac{DATA_k}{R_{k,m,i}}\right]_{k \in G_m} + T_m} \quad (eq.\ 6)$$

Network overhead time $T_m$ may include, for example, time that is spent to enable the transmission of the data to the group $G_m$, such as the time spent on the sounding procedure, time spent on control-plane signaling, buffer periods between transmissions, etc. As another example, network overhead time $T_m$ may include all the time that would elapse between successive group transmissions to the group $G_m$, excluding the time that is spent sending the data to the group $G_m$.

Thus, in the example process of FIG. 3, the MU-MIMO groups may be selected based on SINR values and in consideration of multiple possible bandwidths, with the SINR values being determined using compressed client-side CSI feedback $V_k$. A full representation of the client-side CSI (such as the channel matrix $H_k$) can be very large, and thus if client devices were to transmit full CSI to a beamformer (such as the communications device 100) network overhead may be high. Thus, using the compressed client-side CSI feedback $V_k$ to determine SINR and assigning the clients to MU-MIMO groups based on the SINR reduces network overhead as compared to a case in which full CSI is used to assign clients to MU-MIMO groups. Thus, the functioning of the beamformer and the efficiency of the network are improved by utilizing the example process of FIG. 3. Moreover, various standards (such as IEEE 802.11ac) might not provide for transmission of full CSI by clients to the beamformer, and thus approaches for assigning clients to MU-MIMO groups that rely on the beamformer knowing the full CSI might not be compatible with such standards. On the other hand, various standards (such as IEEE 802.11ac) may provide for transmission of the beamforming feedback $V_k$ from the clients to the beamformer, and thus the example process of FIG. 3 would be compatible with such standards. In addition, because the available bandwidths are explicitly taken into account in the process of selecting MU-MIMO groups, the performance of the network may be optimized.

FIG. 4 illustrates an example pruned-exhaustive selection process that may be used, for example, in block 303 to select MU-MIMO groups. At the start of the process, i is set to 1 and a set U of potential MU-MIMO groups $G_m$ is identified. For example, U may include every possible grouping of the MU-MIMO capable client devices that are connected to the communications device. In this example process, $W_1 > W_2 > \ldots > W_I$.

In block 401, based on $SINR_{k,m,i}$ values, throughputs are determined at the bandwidth $W_i$ for each group in U that is operable at $W_i$.

In block 402, it is determined, for each group in U, whether the group satisfies the SINR threshold condition. If so, that group is removed from U (block 403), and if not then that group is not removed from U. After all of the groups have been considered in block 402, the process proceeds to block 404.

Once block 404 is reached, each group that remains in U at that point has failed the SINR threshold condition. On the other hand, each group that satisfied the SINR threshold condition at $W_i$ was removed from U in block 403. Thus, the groups remaining in U at block 404 (if there are any) need to be considered again at the next lowest bandwidth setting, while the groups removed from U do not need to be considered again at lower bandwidth settings. Accordingly, in block 404, it is determined whether all of the bandwidths have been considered (i=I) or if U is empty, and if the answer to both is No the process proceeds to block 405, in which i is incremented and the process begins again at the next lowest bandwidth for the remaining groups in U. then the process proceeds to block 406. If either i=I or if U is empty, then the process goes to block 406.

In block 406, MU-MIMO groups at assigned bandwidths are selected based on the throughputs that were estimated in block 401. For example, client devices may be assigned to the MU-MIMO groups with assigned bandwidths so as to collectively maximize the group throughputs. Other variables besides throughput may also be considered in assigning the clients to MU-MIMO groups. For example, client assignment to MU-MIMO groups can be subject to clients' hardware capabilities/configurations and selected policies (for example, a client scheduling policy). As another example, traffic with a same priority level may be scheduled for transmission at the same time, and hence the clients who are to receive this traffic may be grouped in the same MU-MIMO group. For example, IEEE 802.11ac allows for traffic classification by assigning a traffic ID, and prioritizing the traffic accordingly to provide QoS. Such additional constraints may be accommodated, for example, by defining different client profiles and assigning clients to these profiles, and then assigning the clients to MU-MIMO groups based on client throughput separately for each profile.

Thus, the process of FIG. 4 selects MU-MIMO based on SINR values and in consideration of multiple possible bandwidths. The process of FIG. 4 may be said to select the groups in consideration of multiple possible bandwidths because it estimates throughputs for combinations of group/bandwidth, starting at a highest bandwidth and proceeding to lower bandwidths as needed.

FIG. 5 illustrates an example informed greedy selection process, which may be used, for example, in block 303 to select MU-MIMO groups. At the start of the process, i is set to 1 and a set U of client device $C_k$ is identified. In this example, $W_1 > W_2 > \ldots > W_I$.

In block 501, at bandwidth $W_i$ a group is constructed that has acceptable throughput based on $SINR_{k,m,i}$ and that satisfied the SINR threshold condition, by greedy selection of client devices.

In block 502, it is determined whether a complete group was constructed in block 501. If not, then the process passes to block 503, i is incremented, and the process begins a new iteration at block 501 at the next highest threshold. In other words, because a complete group that satisfies the criteria of block 501 could not be formed at the bandwidth $W_i$, a next highest bandwidth $W_{i+1}$ may be considered to see if a complete group can be formed at that bandwidth. If block 502 is answered Yes, then the process proceeds to block 504.

In block 504 the client devices of the constructed group are removed from U and the group is added to the set of selected groups.

In block 505, it is determined whether U is empty. If so, then all of the client devices have been assigned to MU-MIMO groups and the process may end. If not, then there still client devices that have not been assigned to MU-MIMO groups and the process returns to block 501 for another iteration. In this case, i is not incremented so that it can be determined whether another complete group could be formed at the bandwidth $W_i$.

Thus, the process of FIG. 5 selects MU-MIMO based on SINR values and in consideration of multiple possible bandwidths. The process of FIG. 5 may be said to select the groups in consideration of multiple possible bandwidths because it iteratively constructs MU-MIMO groups at particular bandwidth settings, starting at a highest bandwidth and proceeding to lower bandwidths as needed.

Figure 6:
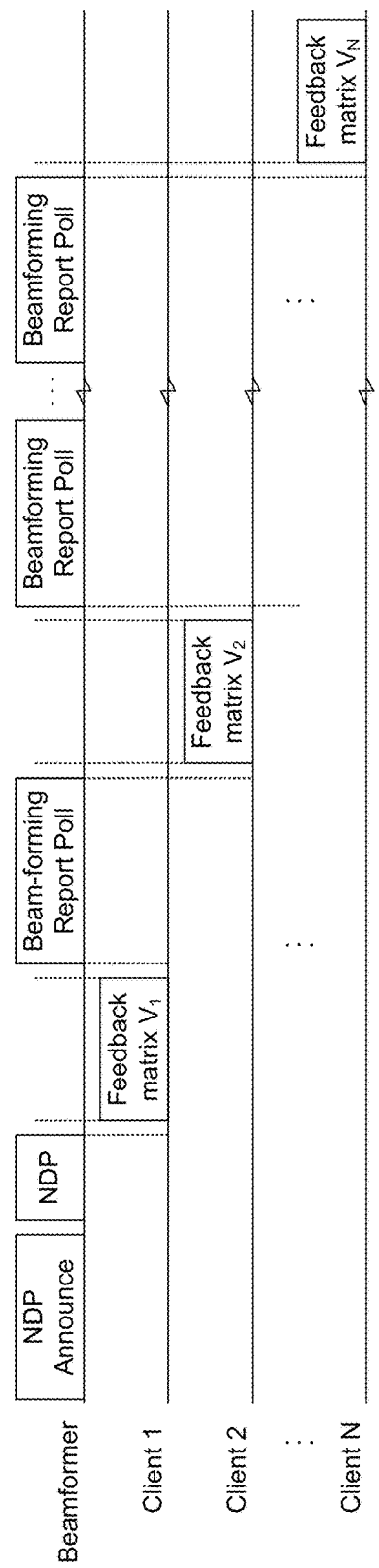
FIG. 6 is a signal diagram illustrating messages generated as part of an example sounding operation.

FIG. 6 illustrates an example sounding procedure, which is one example way in which the compressed client-side CSI feedback $V_{k,i}$ may be received. This process may be performed, for example, by a beamformer (such as the communications device 100). In the example sounding procedure, the beamformer sends a null-data-packet (NDP) announcement followed by a NDP to clients $C_1$ through $C_N$ (which may be examples of the client devices 200). The clients $C_1$ through $C_N$ may use the NDP to measure their channel state at bandwidth $W_i$ and obtain their respective channel matrices $H_{1,i}$ through $H_{N,i}$ (which represent the full CSI), and from this the clients $C_1$ through $C_N$ may obtain their respective compressed client-side CSI feedback $V_{1,i}$ through $V_{N,i}$. In particular, the client $C_k$ may find the singular value decomposition of $H_{k,i}$, $H_{k,i} = U_{k,i} \cdot D_{k,i} \cdot V_{k,i}^H$, and from this obtain $V_{k,i}$. The client device $C_1$ sends the compressed client-side CSI feedback matrix $V_{1,i}$ to the beamformer. The beamformer sends a beamforming report poll, and then client $C_2$ sends compressed client-side CSI feedback matrix $V_{2,i}$ to the beamformer. This is repeated until client $C_N$ has sent compressed client-side CSI feedback matrix $V_{N,i}$ to the beamformer.

Note that the bandwidths $W_i$ corresponding to the matrices $V_{k,i}$ that the client devices $C_k$ send to the beamformer as part of the sounding procedure may be, but do not necessarily have to be, the same for each client device $C_k$. For example, all of the client devices $C_k$ may obtain the compressed CSI $V_{k,i}$ at the lowest bandwidth in response to the sounding procedure. As another example, each client device $C_k$ may obtain the compressed CSI $V_{k,i}$ at whatever bandwidth $W_i$ that the client device $C_k$ happens to be currently operating at. As another example, each client device $C_k$ may obtain the compressed CSI $V_{k,i}$ at the highest bandwidth $W_i$ that the client device $C_k$ is capable of operating at.

In certain examples, the client devices may be sounded only once as part of the MU-MIMO group selection process. In such examples, the beamformer will have compressed CSI feedback for each client device at only one bandwidth setting. In such examples, if the beamformer needs to obtain an SI NR value for a particular client at a different bandwidth, then the compressed CSI at the different bandwidth may be inferred from the compressed CSI that was received as part of the sounding procedure. In particular, if the beamformer received the matrix $V_{a,b}$ from the client device $C_a$ operating at bandwidth $C_b$, then values of $V_{a,i \neq b}$ may be inferred from $V_{a,b}$. In particular, the inventors have found that above a certain bandwidth (e.g., 20 MHz), the compressed CSI received from a client device at one bandwidth may be used as a reasonable estimate of the compressed CSI of the client device at another bandwidth. Thus, if $V_{a,b}$ is received from client device $C_a$ operating at bandwidth $C_b$, then the values $V_{a,i \neq b}$ may be estimated as $V_{a,i \neq b} = V_{a,b}$.

Figure 7:
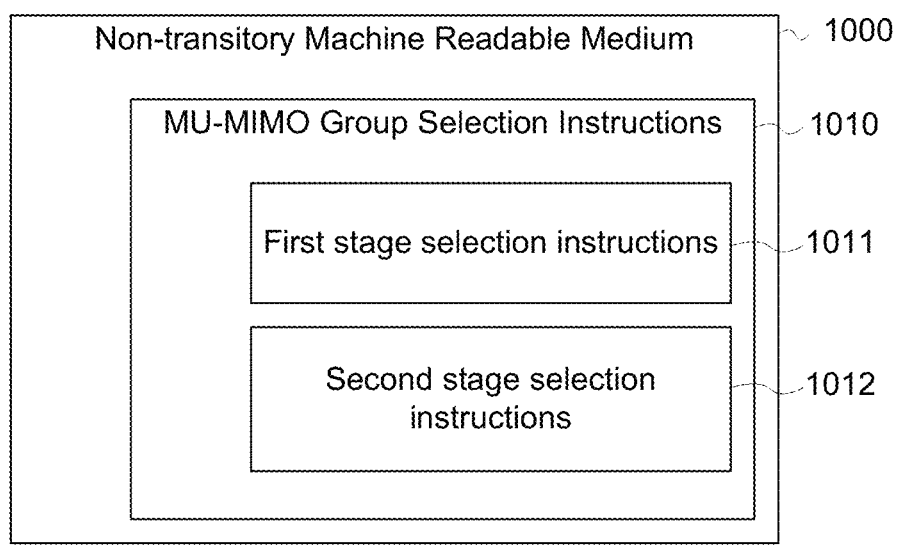
FIG. 7 is a block diagram illustrating an example non-transitory computer readable medium storing MU-MIMO group selection instructions.

FIG. 7 illustrates a non-transitory machine readable medium 1000 that stores MU-MIMO group selection instructions 1010 that are executable by processing circuitry of a beamforming device (such as the processing circuitry 121). The MU-MIMO group selection instructions 1010, when executed, may cause a beamforming device to select a set of MU-MIMO groups, each with an assigned bandwidth setting, that are to be used by the beamforming device in communicating with a number of client devices. For example, the MU-MIMO group selection instructions 1010 may include instructions that, when executed, cause the beamforming device to perform any of the processes described herein, such as the processes of FIGS. 3-5 and/or Algorithm 1.

For example, the MU-MIMO group selection instructions 1010 may cause the beamforming device to select the set of MU-MIMO groups in stages, with a first stage corresponding to a first bandwidth setting and a second stage corresponding to a second bandwidth setting. The MU-MIMO group selection instructions 1010 may include first stage selection instructions 1011 that are executed during the first stage of selection and second stage selection instructions 1012 that are executed during the second stage of selection. The first stage selection instructions 1011 may include instructions that cause the beamforming device to, for each of a first set of potential MU-MIMO groups, estimate SINRs at a first bandwidth setting for the client devices included in the respective potential MU-MIMO group based on compressed client-side CSI received by the beamforming device from the client devices. The first stage selection instructions 1011 may further include instructions that cause the beamforming device to determine, based on the SINRs, whether to select any of the first set of potential MU-MIMO groups at the first bandwidth setting. The second stage selection instructions 1012 may include instructions that cause the beamforming device to, for each of a second set of potential MU-MIMO groups, estimate SINRs at the second bandwidth setting for the client devices included in the respective potential MU-MIMO group. The second stage selection instructions 1012 may further include instructions that cause the beamforming device to determine, based on the SINRs, whether to select any of the second set of potential MU-MIMO groups at the second bandwidth setting.

Throughout this disclosure and in the appended claims, occasionally reference may be made to "a number" of items. Such references to "a number" mean any integer greater than or equal to one. When "a number" is used in this way, the word describing the item(s) may be written with the pluralized "s" for grammatical consistency, but this does not necessarily mean that multiple items are being referred to. Thus, for example, "a number of client devices" could encompass both one client device and multiple client devices.

Various example processes were described above, with reference to various example flow charts. In the description and in the illustrated flow charts, operations are set forth in a particular order for ease of description. However, it should be understood that some or all of the operations could be performed in different orders than those described and that some or all of the operations could be performed concurrently (i.e., in parallel).

As used herein, 'access point' (AP) generally refers to receiving points for any known or convenient wireless access technology which is now or may later become known. Specifically, the term AP is not intended to be limited to IEEE 802.11-based APs. APs generally function as an electronic device that is adapted to allow devices to wirelessly connect to a network via various communications standards.

While the above disclosure has been shown and described with reference to the foregoing examples, it should be understood that other forms, details, and implementations may be made without departing from the spirit and scope of this disclosure.

What is claimed is:

1. A communications device, comprising:
   communications circuitry to wirelessly communicate with a number of client devices using multiple possible bandwidth settings; and
   control circuitry to determine signal-to-interference-plus-noise ratios (SINRs) for the client devices based on compressed client-side channel state information received from the client devices, and to select a set of multi-user-multiple-input-multiple-output (MU-MIMO) groups and bandwidth settings respectively assigned thereto, by:
   estimating, based on the SINRs, bandwidth-specific throughputs for potential MU-MIMO groups at a specified bandwidth setting from among the multiple-possible bandwidth settings, and
   selecting the set of MU-MIMO groups together with their respectively assigned bandwidth settings based on the bandwidth-specific throughputs.

2. The communications device of claim 1,
   wherein, in selecting the set of MU-MIMO groups and the bandwidth settings respectively assigned thereto, the control circuitry is to disqualify one of the potential MU-MIMO groups from being selected at a particular bandwidth setting if the SINR of any of the client devices of the potential MU-MIMO group is less than a threshold.

3. The communications device of claim 1,
   wherein, in selecting the set of MU-MIMO groups and the bandwidth settings respectively assigned thereto, the control circuitry is to:
   consider the potential MU-MIMO groups in stages that correspond respectively to the multiple possible bandwidth settings in descending order of bandwidth, and
   if one of the potential MU-MIMO groups is selected for inclusion in the set of MU-MIMO groups in a first one of the stages, omit consideration of the one of the potential MU-MIMO groups during subsequent stages.

4. The communications device of claim 3,
   wherein in selecting the set of MU-MIMO groups and the bandwidth settings respectively assigned thereto, the control circuitry is to disqualify one of the potential MU-MIMO groups from being selected during the first one of the stages if the SINR of any of the client devices of the potential MU-MIMO group is less than a threshold.

5. The communications device of claim 1,
   wherein the SINRs that are determined for the client devices are for a first bandwidth setting of the multiple possible bandwidth settings, and
   the control circuitry is to, if one of the client devices is to be considered at a second bandwidth setting of the multiple possible bandwidth settings, determine a second SINR for the client device for the second bandwidth setting without requiring an additional polling of the client devices.

6. The communications device of claim 5,
   wherein the control circuitry is to determine the second SINR for any of the client devices by:
   approximating compressed client-side channel state information for the respective client device for the second bandwidth setting by using the compressed client-side channel state information received from the respective client device for the first bandwidth setting, and
   scaling a signal strength factor and a noise factor by a ratio of the first bandwidth setting divided by the second bandwidth setting.

7. A method of controlling a beamforming device, comprising:
   at the beamforming device, receiving compressed client-side channel state information from a number of client devices,
   determining signal-to-interference-plus-noise ratios (SINRs) for the client devices based on the compressed client-side channel state information, and
   selecting a set of multi-user-multiple-input-multiple-output (MU-MIMO) groups and bandwidth settings respectively assigned thereto, by:
   estimating, based on the SINRs, bandwidth-specific throughputs for potential MU-MIMO groups at a specified bandwidth setting from among the multiple-possible bandwidth settings, and
   selecting the set of MU-MIMO groups together with their respectively assigned bandwidth settings based on the bandwidth-specific throughputs.

8. The method of claim 7, further comprising:
   in selecting the set of MU-MIMO groups and the bandwidth settings respectively assigned thereto, disqualifying one of the potential MU-MIMO groups from being selected at a particular bandwidth setting in response to the SINR of one of the client devices of the potential MU-MIMO group being less than a threshold.

9. The method of claim 7, further comprising:
   in selecting the set of MU-MIMO groups and the bandwidth settings respectively assigned thereto, considering the potential MU-MIMO groups in stages that correspond respectively to the multiple possible bandwidth settings in descending order of bandwidth, and
   in response to one of the potential MU-MIMO groups being selected for inclusion in the set of MU-MIMO groups in a first one of the stages, omitting consideration of the one of the potential MU-MIMO groups during subsequent stages.

10. The method of claim 9, further comprising:

in selecting the set of MU-MIMO groups and the bandwidth settings respectively assigned thereto, disqualifying one of the potential MU-MIMO groups from being selected during the first one of the stages in response to the SINR of one of the client devices of the potential MU-MIMO group being less than a threshold.

11. The method of claim 7, wherein the SINR that is determined for each of the client devices is for a first bandwidth setting of the multiple possible bandwidth settings, and the method further comprising, in response to determining that one of the client devices is to be considered at a second bandwidth setting of the multiple possible bandwidth settings, determining a second SINR for the client device for the second bandwidth setting by an operation that does not require an additional polling of the client devices.

12. The method of claim 11, wherein the operation for determining the second SINR for one of the client devices comprises:

approximating compressed client-side channel state information for the client device for the second bandwidth setting by using the compressed client-side channel state information received from the client device for the first bandwidth setting, and scaling a signal strength factor and a noise factor by a ratio of the first bandwidth setting divided by the second bandwidth setting.

13. A non-transitory machine-readable medium that stores instructions that, when executed by processing circuitry of a beamforming device, cause the beamforming device to:

select a set of multi-user-multiple-input-multiple-output (MU-MIMO) groups, each with an assigned bandwidth setting, that are to be used by the beamforming device in communicating with a number client devices by:

in a first selection stage:

for each of a first set of potential MU-MIMO groups, estimating first signal-to-interference-plus-noise ratios (SINRs) at a first bandwidth setting for the client devices included in the respective potential MU-MIMO group based on compressed client-side channel state information received by the beamforming device from the client devices; and determining, based on the first SINRs, whether to select any of the first set of potential MU-MIMO groups at the first bandwidth setting; and in a second selection stage:

for each of a second set of potential MU-MIMO groups, estimating second SINRs at the second bandwidth setting for the client devices included in the respective potential MU-MIMO group; and determining, based on the second SINRs, whether to select any of the second set of potential MU-MIMO groups at the second bandwidth setting.

14. The non-transitory machine-readable medium of claim 13, wherein the instructions, when executed, cause the beamforming device to:

in the first selection stage:

estimate throughputs of the first set of potential MU-MIMO groups based on the first SINRs at the first bandwidth setting, and determine whether to select any of the first set of potential MU-MIMO groups at the first bandwidth setting, based on the throughputs.

15. The non-transitory machine-readable medium of claim 13, wherein the instructions, when executed, cause the beamforming device to:

in the first selection stage, disqualify one of the first set of potential MU-MIMO groups from being selected at the first bandwidth setting if the SINR of any of the client devices of the potential MU-MIMO group is less than a threshold.

16. The non-transitory machine-readable medium of claim 13, wherein the instructions, when executed, cause the beamforming device to:

in the second selection stage, determine the second SINRs without requiring an additional polling of the client devices.

17. The non-transitory machine-readable medium of claim 16, wherein the instructions, when executed, cause the beamforming device to:

determine the second SINR for one of the client devices by:

approximating compressed client-side channel state information for the client device at the second bandwidth setting by using the compressed client-side channel state information received from the client device at the first bandwidth setting, and scaling a signal strength factor and a noise factor by a ratio of the first bandwidth setting divided by the second bandwidth setting.

18. The non-transitory machine-readable medium of claim 13, wherein, when one of the first set of potential MU-MIMO groups is selected in the first selection stage, further consideration of the selected potential MU-MIMO group at additional bandwidth settings in subsequent selection stages is omitted.

* * * * *